UNITED STATES PATENT OFFICE.

HARRY M. HEIMERDINGER, OF BLACKFOOT, IDAHO.

FOOD PRODUCT.

1,295,160.

Specification of Letters Patent. Patented Feb. 25, 1919.

No Drawing. Application filed January 17, 1919. Serial No. 271,705.

*To all whom it may concern:*

Be it known that I, HARRY M. HEIMERDINGER, a citizen of the United States, residing at Blackfoot, in the county of Bingham and State of Idaho, have invented a new and useful Food Product, of which the following is a specification.

This invention relates to a food product one of its objects being to provide a cooked food in the form of a crystallized vegetable or the like such as white potatoes, sweet potatoes, pumpkins, corn, beans, etc. which can be kept indefinitely when properly packed and stored and which, when softened in water, will possess all the ingredients and properties of the food in its original state.

A further object is to provide a food product in the form of crystallized grains having cells therein all of which open through the exterior surfaces of the particles whereby, when the food is placed in water, the moisture will be absorbed quickly and uniformly to restore the food to its original cooked condition.

With the foregoing and other objects in view which will appear as the description proceeds, the invention consists of certain features which will be hereinafter more fully described and pointed out in the claims, it being understood that various changes may be made within the scope of the claims without departing from the invention.

The food product is made from a starchy or farinaceous vegetable such as white or Irish potatoes, sweet potatoes, beans, and the like. In making the product the vegetable is boiled under pressure in a sealed receptacle at 212°–220° F., and in an unskinned condition, until thoroughly cooked. It is removed, while hot and placed in a container having rigid walls provided with perforations, the vegetable being so placed that, when subjected to pressure, the pulp will be forced through one thickness only of the skin of the vegetable and will be pressed into and through the perforations, falling, in the form of grains, onto a distributer which spreads or scatters the grains over a conveyer which carries them into a drier. The grains are here dried without browning and the finished product thereby produced. As the pulp is forced through the skin the water cells in the grains are all opened so as to release the heated moisture therein. This facilitates the drying operation and renders the product very porous, the starch cells being conglomerated with the interior tissue and producing a crystalline grain. All of the dried water cells open through the surfaces of the grain so that the product has an irregular and porous appearance from its cavernulous structure and is hard and brittle. As the pulp is separated from the skin by pressing it through the skin, the grains produced contain all the constituents of the food including the vitamins.

The food, if prepared from cooked potatoes, can be served by adding to it about four parts of water which will be absorbed quickly by the open cells and pores and result in the rapid softening of the product to the consistency of mashed potatoes. When in this form the food can be warmed and served or can be prepared and served in any other way in which mashed potatoes are served. By adding to the food product just enough water to slightly soften the grains so that they will adhere when pressed together, the product can be molded into balls and baked. When the product is dry it can be crushed readily with a roller or burs and formed into flour or can be served as a breakfast food.

What is claimed is:—

1. A cooked vegetable product consisting of the interior pulp portion of a farinaceous vegetable and holding all the food elements thereof, the starch cells being conglomerated with the interior tissue and the water cells open.

2. A cooked vegetable product in the form of hard and brittle grains having dried water cells puffed open and consisting of the interior pulp portion of a farinaceous vegetable holding all the food elements thereof, the starch cells being conglomerated with the interior tissue.

3. A cooked vegetable product in the form of brittle and porous grains having dried water cells opening through the surfaces of the grains, and consisting of the interior pulp portion of a farinaceous vegetable holding all of the food elements thereof, the starch cells being conglomerated with the interior tissue and forming a cavernulous structure.

4. A food product consisting of the cooked pulp portion of a farinaceous vegetable in the form of brittle cavernulous grains.

In testimony that I claim the foregoing as my own I have hereto affixed my signature in the presence of two witnesses.

HARRY M. HEIMERDINGER.

Witnesses:
 IVY J. SIMPSON,
 AGNES ROCKELLI.